US009190216B2

(12) United States Patent
Suto et al.

(10) Patent No.: US 9,190,216 B2
(45) Date of Patent: Nov. 17, 2015

(54) NON-AQUEOUS ELECTROLYTE SOLUTION FOR ELECTRIC DOUBLE-LAYER CAPACITOR

(75) Inventors: Aya Suto, Takasaki (JP); Takeo Tsuzuki, Takasaki (JP); Takatoshi Nagase, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 92 days.

(21) Appl. No.: 14/005,817

(22) PCT Filed: Feb. 16, 2012

(86) PCT No.: PCT/JP2012/053597
§ 371 (c)(1), (2), (4) Date: Oct. 1, 2013

(87) PCT Pub. No.: WO2012/124427
PCT Pub. Date: Sep. 20, 2012

(65) Prior Publication Data

US 2014/0291568 A1 Oct. 2, 2014

(30) Foreign Application Priority Data

Mar. 17, 2011 (JP) ................................. 2011-059140

(51) Int. Cl.

| | |
|---|---|
| *H01G 9/038* | (2006.01) |
| *H01G 9/145* | (2006.01) |
| *H01G 11/60* | (2013.01) |
| *H01G 11/62* | (2013.01) |
| *H01G 9/00* | (2006.01) |

(52) U.S. Cl.
CPC ............... *H01G 9/145* (2013.01); *H01G 11/60* (2013.01); *H01G 11/62* (2013.01); *H01G 2009/0025* (2013.01); *Y02E 60/13* (2013.01)

(58) Field of Classification Search
CPC ............................... H01G 11/60; H01G 9/155
See application file for complete search history.

(56) References Cited

FOREIGN PATENT DOCUMENTS

| | | | |
|---|---|---|---|
| JP | H11-233378 | A | 8/1999 |
| JP | 2009-123789 | A | 6/2009 |
| JP | 2010-272610 | * | 12/2010 |
| JP | 2010-272610 | A | 12/2010 |
| JP | 2011-044632 | A | 3/2011 |

OTHER PUBLICATIONS

An Office Action issued by the Korean Patent Office, mailed Oct. 29, 2014, for Korean counterpart application No. 10-2013-7018887.
International Search Report (ISR) mailed May 22, 2012, issued for international application No. PCT/JP2012/053597.
A Notification of First Office Action with Search Report issued by the State Intellectual Property Office of China, mailed Mar. 26, 2014, for Chinese counterpart application No. 201280013755.4.
A Decision of Refusal issued by the State Intellectual Property Office of China, mailed Jan. 12, 2015, for Chinese counterpart application No. 201280013755.4.

* cited by examiner

*Primary Examiner* — Carol M Koslow
(74) *Attorney, Agent, or Firm* — Law Office of Katsuhiro Arai

(57) ABSTRACT

A non-aqueous electrolyte solution for an electric double-layer capacitor includes a non-aqueous solvent in which electrolyte salt is dissolved. The non-aqueous electrolyte solution is characterized in that the non-aqueous solvent is a mixed solvent of chained sulfone and cyclic lactone compound. The non-aqueous electrolyte solution can suppress increase in the resistance value of the electric storage element even in a low-temperature environment below 0° C. and can also be used in a normal-temperature environment.

5 Claims, 6 Drawing Sheets

Fig. 1

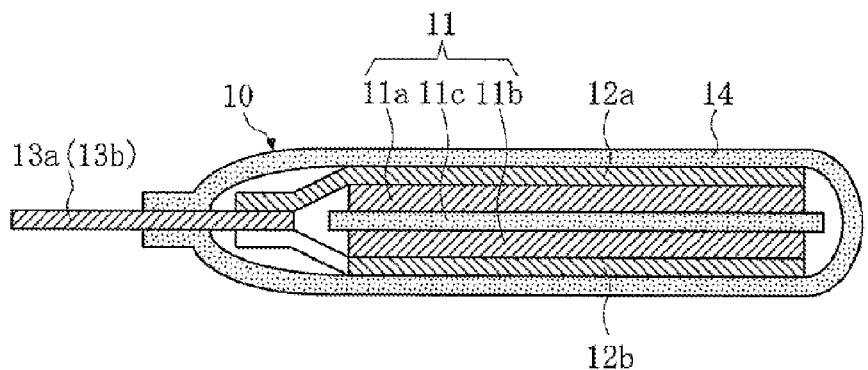

Fig. 2

| | Non-aqueous electrolyte solution | | | | | Resistance value (mΩ) | | Evaluation |
|---|---|---|---|---|---|---|---|---|
| | Composition and mass ratio of non-aqueous solvent | | | Cation and anion (electrolyte salt) | | 25°C | -40°C | |
| Example 1 | EiPS | GBL | 9:1 | SBP | BF4 | 115 | 1971 | △ |
| Example 2 | EiPS | GBL | 8:2 | SBP | BF4 | 104 | 1574 | △ |
| Example 3 | EiPS | GBL | 7:3 | SBP | BF4 | 95 | 1257 | ◎ |
| Example 4 | EiPS | GBL | 6:4 | SBP | BF4 | 86 | 1004 | ◎ |
| Example 5 | EiPS | GBL | 5:5 | SBP | BF4 | 78 | 802 | ◎ |
| Example 6 | EiPS | GBL | 4:6 | SBP | BF4 | 70 | 640 | ◎ |
| Example 7 | EiPS | GBL | 3:7 | SBP | BF4 | 64 | 512 | ◎ |
| Example 8 | EiPS | GBL | 2:8 | SBP | BF4 | 58 | 409 | ◎ |
| Example 9 | EiPS | GBL | 1:9 | SBP | BF4 | 52 | 326 | ◎ |
| Example 10 | EiPS | GBL | 5:5 | SBP | PF6 | 74 | 739 | ◎ |
| Example 11 | EiPS | GBL | 5:5 | SBP | TFSI | 70 | 664 | ◎ |
| Example 12 | EiPS | GBL | 5:5 | TEMA | BF4 | 81 | 1229 | ◎ |
| Example 13 | EiPS | GBL | 5:5 | TEMA | PF6 | 78 | 1133 | ◎ |
| Example 14 | EiPS | GBL | 5:5 | TEMA | TFSI | 74 | 1018 | ◎ |
| Comparative Example 1 | EiPS | --- | --- | SBP | BF4 | 147 | 2900 | --- |

Fig. 3

| | Non-aqueous electrolyte solution | | | | | Resistance value (mΩ) | | Evaluation |
|---|---|---|---|---|---|---|---|---|
| | Composition and mass ratio of non-aqueous solvent | | | Cation and anion (electrolyte salt) | | 25°C | -40°C | |
| Example 15 | EiPS | GVL | 9:1 | SBP | BF4 | 117 | 2080 | △ |
| Example 16 | EiPS | GVL | 8:2 | SBP | BF4 | 106 | 1661 | △ |
| Example 17 | EiPS | GVL | 7:3 | SBP | BF4 | 96 | 1327 | ◎ |
| Example 18 | EiPS | GVL | 6:4 | SBP | BF4 | 87 | 1060 | ◎ |
| Example 19 | EiPS | GVL | 5:5 | SBP | BF4 | 79 | 846 | ◎ |
| Example 20 | EiPS | GVL | 4:6 | SBP | BF4 | 71 | 676 | ◎ |
| Example 21 | EiPS | GVL | 3:7 | SBP | BF4 | 65 | 540 | ◎ |
| Example 22 | EiPS | GVL | 2:8 | SBP | BF4 | 58 | 431 | ◎ |
| Example 23 | EiPS | GVL | 1:9 | SBP | BF4 | 53 | 345 | ◎ |
| Example 24 | EiPS | GVL | 5:5 | SBP | PF6 | 75 | 780 | ◎ |
| Example 25 | EiPS | GVL | 5:5 | SBP | TFSI | 71 | 701 | ◎ |
| Example 26 | EiPS | GVL | 5:5 | TEMA | BF4 | 82 | 1297 | ◎ |
| Example 27 | EiPS | GVL | 5:5 | TEMA | PF6 | 79 | 1196 | ◎ |
| Example 28 | EiPS | GVL | 5:5 | TEMA | TFSI | 75 | 1074 | ◎ |
| Comparative Example 1 | EiPS | --- | --- | SBP | BF4 | 147 | 2900 | --- |

Fig. 4

| | Non-aqueous electrolyte solution | | | | | Resistance value (mΩ) | | Evaluation |
|---|---|---|---|---|---|---|---|---|
| | Composition and mass ratio of non-aqueous solvent | | | Cation and anion (electrolyte salt) | | 25°C | -40°C | |
| Example 29 | EiPS | DVL | 9:1 | SBP | BF4 | 130 | 2650 | △ |
| Example 30 | EiPS | DVL | 8:2 | SBP | BF4 | 118 | 2116 | △ |
| Example 31 | EiPS | DVL | 7:3 | SBP | BF4 | 107 | 1690 | △ |
| Example 32 | EiPS | DVL | 6:4 | SBP | BF4 | 97 | 1350 | ◎ |
| Example 33 | EiPS | DVL | 5:5 | SBP | BF4 | 88 | 1078 | ◎ |
| Example 34 | EiPS | DVL | 4:6 | SBP | BF4 | 79 | 861 | ◎ |
| Example 35 | EiPS | DVL | 3:7 | SBP | BF4 | 72 | 688 | ◎ |
| Example 36 | EiPS | DVL | 2:8 | SBP | BF4 | 65 | 549 | ◎ |
| Example 37 | EiPS | DVL | 1:9 | SBP | BF4 | 59 | 439 | ◎ |
| Example 38 | EiPS | DVL | 5:5 | SBP | PF6 | 84 | 994 | ◎ |
| Example 39 | EiPS | DVL | 5:5 | SBP | TFSI | 79 | 893 | ◎ |
| Example 40 | EiPS | DVL | 5:5 | TEMA | BF4 | 91 | 1652 | △ |
| Example 41 | EiPS | DVL | 5:5 | TEMA | PF6 | 88 | 1523 | △ |
| Example 42 | EiPS | DVL | 5:5 | TEMA | TFSI | 83 | 1368 | ◎ |
| Comparative Example 1 | EiPS | --- | --- | SBP | BF4 | 147 | 2900 | --- |

Fig. 5

| | Non-aqueous electrolyte solution | | | | | Resistance value (mΩ) | | Evaluation |
|---|---|---|---|---|---|---|---|---|
| | Composition and mass ratio of non-aqueous solvent | | | Cation and anion (electrolyte salt) | | 2 5 ℃ | -4 0 ℃ | |
| Example 43 | DMS | GBL | 9：1 | SBP | BF4 | 9489 | 203598 | × |
| Example 44 | DMS | GBL | 8：2 | SBP | BF4 | 4979 | 94279 | × |
| Example 45 | DMS | GBL | 7：3 | SBP | BF4 | 2612 | 43657 | × |
| Example 46 | DMS | GBL | 6：4 | SBP | BF4 | 1371 | 20216 | × |
| Example 47 | DMS | GBL | 5：5 | SBP | BF4 | 719 | 9361 | × |
| Example 48 | DMS | GBL | 4：6 | SBP | BF4 | 378 | 4335 | × |
| Example 49 | DMS | GBL | 3：7 | SBP | BF4 | 198 | 2008 | △ |
| Example 50 | DMS | GBL | 2：8 | SBP | BF4 | 104 | 930 | ○ |
| Example 51 | DMS | GBL | 1：9 | SBP | BF4 | 55 | 431 | ◎ |
| Example 52 | DMS | GBL | 1：9 | SBP | PF6 | 53 | 397 | ◎ |
| Example 53 | DMS | GBL | 1：9 | SBP | TFSI | 50 | 357 | ◎ |
| Example 54 | DMS | GBL | 1：9 | TEMA | BF4 | 58 | 660 | ◎ |
| Example 55 | DMS | GBL | 1：9 | TEMA | PF6 | 55 | 609 | ◎ |
| Example 56 | DMS | GBL | 1：9 | TEMA | TFSI | 53 | 547 | ◎ |
| Comparative Example 1 | EiPS | --- | --- | SBP | BF4 | 147 | 2900 | — |

Fig. 6

| | Non-aqueous electrolyte solution | | | | | Resistance value (mΩ) | | Evaluation |
|---|---|---|---|---|---|---|---|---|
| | Composition and mass ratio of non-aqueous solvent | | | Cation and anion (electrolyte salt) | | 2 5 ℃ | -4 0 ℃ | |
| Example 57 | EMS | GBL | 9：1 | SBP | BF4 | 158 | 2914 | × |
| Example 58 | EMS | GBL | 8：2 | SBP | BF4 | 136 | 2212 | △ |
| Example 59 | EMS | GBL | 7：3 | SBP | BF4 | 117 | 1679 | △ |
| Example 60 | EMS | GBL | 6：4 | SBP | BF4 | 101 | 1274 | ○ |
| Example 61 | EMS | GBL | 5：5 | SBP | BF4 | 87 | 967 | ◎ |
| Example 62 | EMS | GBL | 4：6 | SBP | BF4 | 74 | 734 | ◎ |
| Example 63 | EMS | GBL | 3：7 | SBP | BF4 | 64 | 557 | ◎ |
| Example 64 | EMS | GBL | 2：8 | SBP | BF4 | 55 | 423 | ◎ |
| Example 65 | EMS | GBL | 1：9 | SBP | BF4 | 48 | 321 | ◎ |
| Example 66 | EMS | GBL | 5：5 | SBP | PF6 | 83 | 891 | ◎ |
| Example 67 | EMS | GBL | 5：5 | SBP | TFSI | 79 | 801 | ◎ |
| Example 68 | EMS | GBL | 5：5 | TEMA | BF4 | 91 | 1482 | ◎ |
| Example 69 | EMS | GBL | 5：5 | TEMA | PF6 | 87 | 1366 | ◎ |
| Example 70 | EMS | GBL | 5：5 | TEMA | TFSI | 83 | 1227 | ◎ |
| Comparative Example 1 | EiPS | --- | --- | SBP | BF4 | 147 | 2900 | — |

Fig. 7

| | Non-aqueous electrolyte solution | | | | | Resistance value (mΩ) | | Evaluation |
|---|---|---|---|---|---|---|---|---|
| | Composition and mass ratio of non-aqueous solvent | | | Cation and anion (electrolyte salt) | | 25℃ | -40℃ | |
| Example 71 | DES | GBL | 9:1 | SBP | BF4 | 8920 | 179755 | × |
| Example 72 | DES | GBL | 8:2 | SBP | BF4 | 4680 | 83239 | × |
| Example 73 | DES | GBL | 7:3 | SBP | BF4 | 2456 | 38545 | × |
| Example 74 | DES | GBL | 6:4 | SBP | BF4 | 1289 | 17849 | × |
| Example 75 | DES | GBL | 5:5 | SBP | BF4 | 676 | 8265 | × |
| Example 76 | DES | GBL | 4:6 | SBP | BF4 | 355 | 3828 | × |
| Example 77 | DES | GBL | 3:7 | SBP | BF4 | 187 | 1773 | △ |
| Example 78 | DES | GBL | 2:8 | SBP | BF4 | 98 | 821 | ◎ |
| Example 79 | DES | GBL | 1:9 | SBP | BF4 | 52 | 380 | ◎ |
| Example 80 | DES | GBL | 1:9 | SBP | PF6 | 50 | 351 | ◎ |
| Example 81 | DES | GBL | 1:9 | SBP | TFSI | 47 | 315 | ◎ |
| Example 82 | DES | GBL | 1:9 | TEMA | BF4 | 54 | 583 | ◎ |
| Example 83 | DES | GBL | 1:9 | TEMA | PF6 | 52 | 537 | ◎ |
| Example 84 | DES | GBL | 1:9 | TEMA | TFSI | 49 | 483 | ◎ |
| Comparative Example 1 | EiPS | --- | --- | SBP | BF4 | 147 | 2900 | --- |

Fig. 8

| | Non-aqueous electrolyte solution | | | | | Resistance value (mΩ) | | Evaluation |
|---|---|---|---|---|---|---|---|---|
| | Composition and mass ratio of non-aqueous solvent | | | Cation and anion (electrolyte salt) | | 25℃ | -40℃ | |
| Example 85 | MiPS | GBL | 9:1 | SBP | BF4 | 117 | 2078 | △ |
| Example 86 | MiPS | GBL | 8:2 | SBP | BF4 | 106 | 1659 | △ |
| Example 87 | MiPS | GBL | 7:3 | SBP | BF4 | 96 | 1325 | ◎ |
| Example 88 | MiPS | GBL | 6:4 | SBP | BF4 | 87 | 1058 | ◎ |
| Example 89 | MiPS | GBL | 5:5 | SBP | BF4 | 79 | 845 | ◎ |
| Example 90 | MiPS | GBL | 4:6 | SBP | BF4 | 71 | 675 | ◎ |
| Example 91 | MiPS | GBL | 3:7 | SBP | BF4 | 65 | 539 | ◎ |
| Example 92 | MiPS | GBL | 2:8 | SBP | BF4 | 58 | 431 | ◎ |
| Example 93 | MiPS | GBL | 1:9 | SBP | BF4 | 53 | 344 | ◎ |
| Example 94 | MiPS | GBL | 5:5 | SBP | PF6 | 76 | 779 | ◎ |
| Example 95 | MiPS | GBL | 5:5 | SBP | TFSI | 72 | 700 | ◎ |
| Example 96 | MiPS | GBL | 5:5 | TEMA | BF4 | 83 | 1296 | ◎ |
| Example 97 | MiPS | GBL | 5:5 | TEMA | PF6 | 79 | 1194 | ◎ |
| Example 98 | MiPS | GBL | 5:5 | TEMA | TFSI | 75 | 1073 | ◎ |
| Comparative Example 1 | EiPS | --- | --- | SBP | BF4 | 147 | 2900 | --- |

Fig. 9

|  | Non-aqueous electrolyte solution | | | | | Resistance value (mΩ) | | Evaluation |
|---|---|---|---|---|---|---|---|---|
|  | Composition and mass ratio of non-aqueous solvent | | | Cation and anion (electrolyte salt) | | 25°C | -40°C |  |
| Example 99 | EiBS | GBL | 9:1 | SBP | BF4 | 119 | 1995 | △ |
| Example 100 | EiBS | GBL | 8:2 | SBP | BF4 | 108 | 1593 | △ |
| Example 101 | EiBS | GBL | 7:3 | SBP | BF4 | 98 | 1272 | ◎ |
| Example 102 | EiBS | GBL | 6:4 | SBP | BF4 | 88 | 1016 | ◎ |
| Example 103 | EiBS | GBL | 5:5 | SBP | BF4 | 80 | 812 | ◎ |
| Example 104 | EiBS | GBL | 4:6 | SBP | BF4 | 72 | 648 | ◎ |
| Example 105 | EiBS | GBL | 3:7 | SBP | BF4 | 66 | 518 | ◎ |
| Example 106 | EiBS | GBL | 2:8 | SBP | BF4 | 59 | 414 | ◎ |
| Example 107 | EiBS | GBL | 1:9 | SBP | BF4 | 54 | 330 | ◎ |
| Example 108 | EiBS | GBL | 5:5 | SBP | PF6 | 77 | 748 | ◎ |
| Example 109 | EiBS | GBL | 5:5 | SBP | TFSI | 73 | 672 | ◎ |
| Example 110 | EiBS | GBL | 5:5 | TEMA | BF4 | 84 | 1224 | ◎ |
| Example 111 | EiBS | GBL | 5:5 | TEMA | PF6 | 81 | 1146 | ◎ |
| Example 112 | EiBS | GBL | 5:5 | TEMA | TFSI | 76 | 1030 | ◎ |
| Comparative Example 1 | EiPS | ---- | --- | SBP | BF4 | 147 | 2900 | - |

Fig. 10

|  | Non-aqueous electrolyte solution | | | | | Resistance value (mΩ) | | Evaluation |
|---|---|---|---|---|---|---|---|---|
|  | Composition and mass ratio of non-aqueous solvent | | | Cation and anion (electrolyte salt) | | 25°C | -40°C |  |
| Example 113 | iBiPS | GBL | 9:1 | SBP | BF4 | 125 | 2089 | △ |
| Example 114 | iBiPS | GBL | 8:2 | SBP | BF4 | 113 | 1668 | △ |
| Example 115 | iBiPS | GBL | 7:3 | SBP | BF4 | 103 | 1332 | ◎ |
| Example 116 | iBiPS | GBL | 6:4 | SBP | BF4 | 93 | 1064 | ◎ |
| Example 117 | iBiPS | GBL | 5:5 | SBP | BF4 | 84 | 850 | ◎ |
| Example 118 | iBiPS | GBL | 4:6 | SBP | BF4 | 76 | 679 | ◎ |
| Example 119 | iBiPS | GBL | 3:7 | SBP | BF4 | 69 | 542 | ◎ |
| Example 120 | iBiPS | GBL | 2:8 | SBP | BF4 | 63 | 433 | ◎ |
| Example 121 | iBiPS | GBL | 1:9 | SBP | BF4 | 57 | 346 | ◎ |
| Example 122 | iBiPS | GBL | 5:5 | SBP | PF6 | 81 | 783 | ◎ |
| Example 123 | iBiPS | GBL | 5:5 | SBP | TFSI | 77 | 704 | ◎ |
| Example 124 | iBiPS | GBL | 5:5 | TEMA | BF4 | 88 | 1303 | ◎ |
| Example 125 | iBiPS | GBL | 5:5 | TEMA | PF6 | 85 | 1201 | ◎ |
| Example 126 | iBiPS | GBL | 5:5 | TEMA | TFSI | 80 | 1079 | ◎ |
| Comparative Example 1 | EiPS | --- | --- | SBP | BF4 | 147 | 2900 | - |

Fig. 11

|  | Non-aqueous electrolyte solution | | | | | Resistance value (mΩ) | | Evaluation |
|---|---|---|---|---|---|---|---|---|
|  | Composition and mass ratio of non-aqueous solvent | | | Cation and anion (electrolyte salt) | | 25℃ | -40℃ |  |
| Example 127 | iBsBS | GBL | 9:1 | SBP | BF4 | 127 | 2213 | △ |
| Example 128 | iBsBS | GBL | 8:2 | SBP | BF4 | 115 | 1767 | △ |
| Example 129 | iBsBS | GBL | 7:3 | SBP | BF4 | 104 | 1411 | ○ |
| Example 130 | iBsBS | GBL | 6:4 | SBP | BF4 | 94 | 1127 | ◎ |
| Example 131 | iBsBS | GBL | 5:5 | SBP | BF4 | 85 | 900 | ◎ |
| Example 132 | iBsBS | GBL | 4:6 | SBP | BF4 | 77 | 719 | ◎ |
| Example 133 | iBsBS | GBL | 3:7 | SBP | BF4 | 70 | 574 | ◎ |
| Example 134 | iBsBS | GBL | 2:8 | SBP | BF4 | 63 | 459 | ◎ |
| Example 135 | iBsBS | GBL | 1:9 | SBP | BF4 | 57 | 366 | ◎ |
| Example 136 | iBsBS | GBL | 5:5 | SBP | PF6 | 82 | 830 | ◎ |
| Example 137 | iBsBS | GBL | 5:5 | SBP | TFSI | 78 | 746 | ◎ |
| Example 138 | iBsBS | GBL | 5:5 | TEMA | BF4 | 90 | 1380 | ◎ |
| Example 139 | iBsBS | GBL | 5:5 | TEMA | PF6 | 86 | 1272 | ◎ |
| Example 140 | iBsBS | GBL | 5:5 | TEMA | TFSI | 82 | 1143 | ◎ |
| Comparative Example 1 | EiPS | --- | --- | SBP | BF4 | 147 | 2900 | - |

Fig. 12

|  | Non-aqueous electrolyte solution | | | | | Resistance value (mΩ) | | Evaluation |
|---|---|---|---|---|---|---|---|---|
|  | Composition and mass ratio of non-aqueous solvent | | | Cation and anion (electrolyte salt) | | 25℃ | -40℃ |  |
| Example 141 | BiBS | GBL | 9:1 | SBP | BF4 | 145 | 2504 | △ |
| Example 142 | BiBS | GBL | 8:2 | SBP | BF4 | 131 | 2000 | △ |
| Example 143 | BiBS | GBL | 7:3 | SBP | BF4 | 119 | 1597 | △ |
| Example 144 | BiBS | GBL | 6:4 | SBP | BF4 | 108 | 1276 | ○ |
| Example 145 | BiBS | GBL | 5:5 | SBP | BF4 | 98 | 1019 | ◎ |
| Example 146 | BiBS | GBL | 4:6 | SBP | BF4 | 88 | 814 | ◎ |
| Example 147 | BiBS | GBL | 3:7 | SBP | BF4 | 80 | 650 | ◎ |
| Example 148 | BiBS | GBL | 2:8 | SBP | BF4 | 72 | 519 | ◎ |
| Example 149 | BiBS | GBL | 1:9 | SBP | BF4 | 66 | 415 | ◎ |
| Example 150 | BiBS | GBL | 5:5 | SBP | PF6 | 94 | 939 | ◎ |
| Example 151 | BiBS | GBL | 5:5 | SBP | TFSI | 89 | 844 | ◎ |
| Example 152 | BiBS | GBL | 5:5 | TEMA | BF4 | 102 | 1562 | △ |
| Example 153 | BiBS | GBL | 5:5 | TEMA | PF6 | 98 | 1439 | ◎ |
| Example 154 | BiBS | GBL | 5:5 | TEMA | TFSI | 93 | 1293 | ◎ |
| Comparative Example 1 | EiPS | --- | --- | SBP | BF4 | 147 | 2900 | - | ns
NON-AQUEOUS ELECTROLYTE SOLUTION FOR ELECTRIC DOUBLE-LAYER CAPACITOR

This Application is the U.S. National Phase under 35 U.S.C. §371 of International Application PCT/JP2012/053597, filed Feb. 16, 2012, which claims priority to Japanese Patent Application No. 2011-059140, filed Mar. 17, 2011. The International Application was published under PCT Article 21(2) in a language other than English.

TECHNICAL FIELD

The present invention relates to a non-aqueous electrolyte solution useful for electric double-layer capacitors.

BACKGROUND ART

An electric double-layer capacitor has a built-in electric storage element impregnated with non-aqueous electrolyte solution (=non-aqueous solvent in which electrolyte salt is dissolved). This non-aqueous electrolyte solution generally uses propylene carbonate or other carbonate ester as a non-aqueous solvent, but because carbonate ester reacts with water and breaks down during electrical charging, non-aqueous electrolyte solutions using sulfolane or other cyclic sulfone having lower reactivity with water than carbonate ester for the non-aqueous solvent have been proposed (refer to Patent Literature 1).

However, cyclic sulfones have higher viscosity than carbonate ester and therefore an electric storage element using a cyclic sulfone of higher viscosity tends to have higher resistance, and for this reason non-aqueous electrolyte solutions using dimethyl sulfone or other chained sulfone having lower viscosity than cyclic sulfones for the non-aqueous solvent have been proposed (refer to Patent Literature 2).

However, chained sulfones, while having lower viscosity than cyclic sulfones, become highly viscous in a low-temperature environment, especially below 0° C. As the viscosity of the chained sulfone in the electric storage element increases, the resistance value of the electric storage element rises beyond the practical range, and consequently the charge/discharge characteristics of the electric double-layer capacitor itself drop significantly.

It should be noted that such electric double-layer capacitors are considered important power sources suitable for backing up the memory, etc., for mobile phones, notebook PCs, video cameras, digital cameras, and other electronic devices. These electronic devices are often used in a low-temperature environment below 0° C., so there are very strong needs for a non-aqueous electrolyte solution for electric double-layer capacitors that does not cause the resistance value of the electric storage element to rise even in a low-temperature environment below 0° C.

BACKGROUND ART LITERATURE

Patent Literature

Patent Literature 1: Japanese Patent Laid-open No. Hei 11-233378
Patent Literature 2: Japanese Patent Laid-open No. 2009-123789

SUMMARY OF THE INVENTION

Problems to be Solved by the Invention

The object of the present invention is to provide a non-aqueous electrolyte solution for an electric double-layer capacitor capable of suppressing increase in the resistance value of the electric storage element even in a low-temperature environment below 0° C.

Means for Solving the Problems

To achieve the above object, the present invention (non-aqueous electrolyte solution for an electric double-layer capacitor) provides a non-aqueous electrolyte solution constituted by a non-aqueous solvent in which electrolyte salt is dissolved, characterized in that the non-aqueous solvent is a mixed solvent of chained sulfone and cyclic lactone compound.

Effects of the Invention

According to the present invention, use of a mixed solvent of chained sulfone and cyclic lactone compound for the non-aqueous solvent suppresses drop in the resistance value of the electric storage element in a low-temperature environment, which in turn prevents the charge/discharge characteristics of the electric double-layer capacitor itself from increasing significantly even in a low-temperature environment below 0° C.

The aforementioned and other objects, constitutions and characteristics, and operations and effects, of the present invention are made clear by the following explanations and drawings attached hereto.

BRIEF DESCRIPTION OF THE DRAWINGS

FIG. 1 is a drawing showing the electric double-layer capacitor used when the values of "resistances at 25° C. and −40° C. (mΩ)" in FIGS. 2 to 12 were measured.

FIG. 2 is a table showing the compositions and mass ratios, cations and anions (electrolyte salts), resistances at 25° C. and −40° C. (mΩ), and evaluations, of the non-aqueous solvents pertaining to the non-aqueous electrolyte solutions in Examples 1 to 14.

FIG. 3 is a table showing the compositions and mass ratios, cations and anions (electrolyte salts), resistances at 25° C. and −40° C. (mΩ), and evaluations, of the non-aqueous solvents pertaining to the non-aqueous electrolyte solutions in Examples 15 to 28.

FIG. 4 is a table showing the compositions and mass ratios, cations and anions (electrolyte salts), resistances at 25° C. and −40° C. (mΩ), and evaluations, of the non-aqueous solvents pertaining to the non-aqueous electrolyte solutions in Examples 29 to 42.

FIG. 5 is a table showing the compositions and mass ratios, cations and anions (electrolyte salts), resistances at 25° C. and −40° C. (mΩ), and evaluations, of the non-aqueous solvents pertaining to the non-aqueous electrolyte solutions in Examples 43 to 56.

FIG. 6 is a table showing the compositions and mass ratios, cations and anions (electrolyte salts), resistances at 25° C. and −40° C. (mΩ), and evaluations, of the non-aqueous solvents pertaining to the non-aqueous electrolyte solutions in Examples 57 to 70.

FIG. 7 is a table showing the compositions and mass ratios, cations and anions (electrolyte salts), resistances at 25° C. and −40° C. (mΩ), and evaluations, of the non-aqueous solvents pertaining to the non-aqueous electrolyte solutions in Examples 71 to 84.

FIG. 8 is a table showing the compositions and mass ratios, cations and anions (electrolyte salts), resistances at 25° C. and −40° C. (mΩ), and evaluations, of the non-aqueous solvents pertaining to the non-aqueous electrolyte solutions in Examples 85 to 98.

FIG. 9 is a table showing the compositions and mass ratios, cations and anions (electrolyte salts), resistances at 25° C. and −40° C. (mΩ), and evaluations, of the non-aqueous solvents pertaining to the non-aqueous electrolyte solutions in Examples 99 to 112.

FIG. 10 is a table showing the compositions and mass ratios, cations and anions (electrolyte salts), resistances at 25° C. and −40° C. (mΩ), and evaluations, of the non-aqueous solvents pertaining to the non-aqueous electrolyte solutions in Examples 113 to 126.

FIG. 11 is a table showing the compositions and mass ratios, cations and anions (electrolyte salts), resistances at 25° C. and −40° C. (mΩ), and evaluations, of the non-aqueous solvents pertaining to the non-aqueous electrolyte solutions in Examples 127 to 140.

FIG. 12 is a table showing the compositions and mass ratios, cations and anions (electrolyte salts), resistances at 25° C. and −40° C. (mΩ), and evaluations, of the non-aqueous solvents pertaining to the non-aqueous electrolyte solutions in Examples 141 to 154.

MODE FOR CARRYING OUT THE INVENTION

The non-aqueous electrolyte solution for an electric double-layer capacitor proposed by the present invention is a non-aqueous electrolyte solution constituted by a non-aqueous solvent in which electrolyte salt is dissolved, characterized in that the non-aqueous solvent is a mixed solvent of chained sulfone and cyclic lactone compound.

For the chained sulfone, ethyl isopropyl sulfone (abbreviated as EiPS), dimethyl sulfone (abbreviated as DMS), ethyl methyl sulfone (abbreviated as EMS), diethyl sulfone (abbreviated as DES), isopropyl methyl sulfone (abbreviated as MiPS), ethyl isobutyl sulfone (abbreviated as EiBS), isobutyl isopropyl sulfone (abbreviated as iBiPS), isobutyl sec-butyl sulfone (abbreviated as iBsBS), butyl isobutyl sulfone (abbreviated as BiBS), etc., can be used favorably. Each of these chained sulfones may be used alone or two or more types may be mixed. Additionally for the cyclic lactone compound, γ-butyrolactone (abbreviated as GBL), γ-valerolactone (abbreviated as GVL), δ-valerolactone (abbreviated as DVL), etc., can be used favorably. Each of these cyclic lactone compounds may be used alone or two or more types may be mixed.

The electrolyte salt is not limited in any way as long as it is dissociated into a cation and an anion as the salt is dissolved in the non-aqueous solvent, but 5-azoniaspiro[4.4]nonane ion (abbreviated as SBP), triethylmethylammonium ion (abbreviated as TEMA), etc., can be used favorably for the cation of electrolyte salt. Each of these cations may be used alone or two or more types may be mixed. Additionally for the anion of electrolyte salt, tetrafluoroborate ion (abbreviated as BF4), hexafluorophosphate ion (abbreviated as PF6), bis[(trifluoromethyl)sulfonyl]imide ion (abbreviated as TFSI), etc., can be used favorably. Each of these anions may be used alone or two or more types may be mixed.

Electrolyte salt whose cation is SBP and anion is BF4 is 5-azoniaspiro[4.4]nonane tetrafluoroborate, while electrolyte salt whose cation is SBP and anion is PF6 is 5-azoniaspiro[4.4]nonane hexafluorophosphate. Electrolyte salt whose cation is SBP and anion is TFSI is 5-azoniaspiro[4.4]nonane bis[(trifluoromethyl)sulfonyl]amide, while electrolyte salt whose cation is TEMA and anion is BF4 is triethylmethylammonium tetrafluoroborate. Electrolyte salt whose cation is TEMA and anion is PF6 is triethylmethylammonium hexafluorophosphate, while electrolyte salt whose cation is TEMA and anion is TFSI is triethylmethylammonium bis [(trifluoromethyl)sulfonyl]amide.

The present invention is explained in detail below according to FIGS. 1 to 12, where the chained sulfones and cyclic lactone compounds constituting the non-aqueous solvents are indicated by their abbreviations mentioned above, while the cations and anions constituting the electrolyte salts are also indicated by their abbreviations mentioned above, in FIGS. 2 to 12, as well.

[Explanation of FIG. 1]

FIG. 1 shows the electric double-layer capacitor used when the values of "resistances at 25° C. and −40° C. (mΩ)" in FIGS. 2 to 12 explained later were measured. This electric double-layer capacitor 10 has an electric storage element 11, a pair of collector sheets 12a, 12b, a pair of terminals 13a, 13b, and a film package 14.

The electric storage element 11 comprises a rectangular-shaped first electrode sheet 11a formed by active carbon, a rectangular-shaped second electrode sheet 11b formed by active carbon, and a rectangular-shaped separate sheet 11c formed by fibrous porous material and inserted between the two electrode sheets 11a, 11b. The electrode sheets 11a, 11b have a thickness of 10 μm each, while the separate sheet 11c has a thickness of 30 μm. The non-aqueous electrolyte solution mentioned later is impregnated in the first electrode sheet 11a, second electrode sheet 11b and separate sheet 11c.

The collector sheets 12a, 12b are each formed by a rectangular-shaped aluminum, where the top collector sheet 12a contacts the top face of the first electrode sheet 11a, while the bottom collector sheet 12b contacts the bottom face of the second electrode sheet 11b. The collector sheets 12a, 12b have a thickness of 20 μm each.

The terminals 13a, 13b are each formed by a rectangular-shaped aluminum, where an end of one terminal 13a is connected to an end of the top collector sheet 12a, while an end of the other terminal 13b is connected to an end of the bottom collector sheet 12b. The terminals 13a, 13b have a thickness of 100 μm each.

The film package 14 is constituted by a film material of 100 μm in thickness having a heat seal layer on its interior face, and covers the entire electric storage element 11 and connected ends of the terminals 13a, 13b and also heat-seals the open parts. In other words, the electric storage element 11 is sealed in the film package 14 together with the electrolyte solution.

[Explanation of Items in FIGS. 2 to 12]

In FIGS. 2 to 12, the abbreviation of chained sulfone, abbreviation of cyclic lactone compound and mass ratio of the two are shown in this order from the left under the item "Non-aqueous electrolyte solution/Composition and mass ratio of non-aqueous solvent," while the abbreviation of cation and abbreviation of anion are shown in this order from the left under the item "Non-aqueous electrolyte solution/Cation and anion (electrolyte salt)." Also, the non-aqueous electrolyte solution provided for comparison with the non-aqueous electrolyte solutions in Examples 1 to 154 (Comparative Example 1) is shown at the bottom of FIGS. 2 to 12. This non-aqueous electrolyte solution in Comparative Example 1 is different from the non-aqueous electrolyte solution in Example 1 in that its non-aqueous solvent is constituted by EiPS alone. The non-aqueous electrolyte solutions in Examples 1 to 154 and non-aqueous electrolyte solution in Comparative Example 1 all have the same concentration of electrolyte salt of 1.5 mols/liter.

Also, shown under the item "Resistance value (mΩ)/25° C., −40° C." in FIGS. 2 to 12 are the resistance values of electric storage elements as alternating-current impedances at a measurement frequency of 1 kHz, measured by a LCR meter through the pair of terminals 13a, 13b after leaving each electric double-layer capacitor 10, where the non-aqueous electrolyte solutions in Examples 1 to 154 and the non-aqueous electrolyte solution in Comparative Example 1 were used for the electric double-layer capacitor 10 shown in FIG. 1, in an atmospheric ambience of 25° C. representing a normal-temperature environment for one hour, and also after leaving it in an atmospheric ambience of −40° C. representing a low-temperature environment for one hour.

Furthermore, the evaluation results of temperature characteristics of the non-aqueous electrolyte solutions in Examples 1 to 154, based on the resistance values shown under "Resistance value (mΩ)/25° C., −40° C.," are shown under the item "Evaluation" in FIGS. 2 to 12.

To be specific, the reference for resistance value at 25° C. was set to 100 mΩ, while the reference for resistance value at −40° C. was set to 1500 mΩ, and ⊙ indicating "Very good for practical use" was given when both of the following conditions were satisfied:

Resistance value at 25° C.≤100 mΩ
Resistance value at −40° C.≤1500 mΩ

Similarly, a ○ indicating "Good for practical use" was given when both of the following conditions were satisfied:

Resistance value at 25° C. in Comparative Example 1 (147 mΩ)>Resistance value at 25° C.>100 mΩ
Resistance value at −40° C.≤1500 mΩ

Also, a Δ indicating "Slightly good for practical use" was given when the following condition was satisfied, regardless of the resistance value at 25° C.:

Resistance value at −40° C. in Comparative Example 1 (2900 mΩ)>Resistance value at −40° C.>1500 mΩ

Also, an X indicating "Not acceptable for practical use" was given when the following condition was satisfied, regardless of the resistance value at 25° C.:

Resistance value at −40° C.>Resistance value at −40° C. in Comparative Example 1 (2900 mΩ)

Here, why the reference for resistance value at 25° C. was set to 100 mΩ, while the reference for resistance value at −40° C. was set to 1500 mΩ, is explained.

With any electric double-layer capacitor, the resistance value of its electric storage element is an important characteristic that affects the energy that can be taken out of the electric double-layer capacitor. When a charged electric double-layer capacitor is connected to a load and discharged, its voltage drops instantly depending on the resistance value of the electric storage element and the discharge current value, and energy corresponding to the voltage drop is lost. In other words, based on the relationship of Voltage drop (V)=Resistance value (Ω)×Discharge current value (A), the higher the current used to take out energy, the greater the energy loss from voltage drop becomes.

Accordingly, the resistance value of the electric storage element must be decreased to reduce the energy loss from voltage drop. For an electric double-layer capacitor of 3.0 V in rated voltage and 1 A in discharge current, for example, in a normal-temperature environment (25° C.), it is practical to keep the voltage drop in the electric storage element to 0.1 V or less, and to achieve this, the resistance value of the electric storage element at 25° C. is preferably adjusted to 100 mΩ or less. Also in a low-temperature environment (−40° C.), where the resistance value rises more than in a normal-temperature environment (25° C.), it is practical to keep the voltage drop in the electric storage element to one-half the rated voltage (3 V), or 1.5 V, or less, and to achieve this, the resistance value of the electric storage element at −40° C. is preferably adjusted to 1500 mΩ or less.

[Explanation of Non-aqueous Electrolyte Solutions in Examples 1 to 14 Shown in FIG. 2]

Examples 1 to 14 represent non-aqueous electrolyte solutions whose non-aqueous solvent is a mixed solvent of EiPS and GBL. In Examples 1 to 9, the cation and anion are SBP and BF4, respectively, with the mass ratio of EiPS and GBL varied from 9:1 to 1:9. In Examples 10 to 14, on the other hand, the mass ratio of EiPS and GBL is fixed to 5:5, with the combination of cation and anion changed from the one used in Examples 1 to 9.

As is evident from the resistance values (mΩ) and evaluations of Examples 1 to 9, the evaluation "Very good for practical use (⊙)" was given when the mass ratio of EiPS and GBL was in a range of 7:3 to 1:9. Although the evaluation was "Slightly good for practical use (Δ)" when the mass ratio of EiPS and GBL was in a range of 9:1 to 8:2, use of these non-aqueous electrolyte solutions in practical applications is amply possible.

Additionally, as is evident from the resistance values (mΩ) and evaluations of Examples 10 to 14, the evaluation "Very good for practical use (⊙)" was given also when the combination of cation and anion was changed from the one used in Examples 1 to 9.

[Explanation of Non-aqueous Electrolyte Solutions in Examples 15 to 28 Shown in FIG. 3]

Examples 15 to 28 represent non-aqueous electrolyte solutions whose non-aqueous solvent is a mixed solvent of EiPS and GVL. In Examples 15 to 23, the cation and anion are SBP and BF4, respectively, with the mass ratio of EiPS and GBL varied from 9:1 to 1:9. In Examples 24 to 28, on the other hand, the mass ratio of EiPS and GVL is fixed to 5:5, with the combination of cation and anion changed from the one used in Examples 15 to 23.

As is evident from the resistance values (mΩ) and evaluations of Examples 15 to 23, the evaluation "Very good for practical use (⊙)" was given when the mass ratio of EiPS and GVL was in a range of 7:3 to 1:9. Although the evaluation was "Slightly good for practical use (Δ)" when the mass ratio of EiPS and GVL was in a range of 9:1 to 8:2, use of these non-aqueous electrolyte solutions in practical applications is amply possible.

Additionally, as is evident from the resistance values (mΩ) and evaluations of Examples 24 to 28, the evaluation "Very good for practical use (⊙)" was given also when the combination of cation and anion was changed from the one used in Examples 15 to 23.

[Explanation of Non-aqueous Electrolyte Solutions in Examples 29 to 42 Shown in FIG. 4]

Examples 29 to 42 represent non-aqueous electrolyte solutions whose non-aqueous solvent is a mixed solvent of EiPS and DVL. In Examples 29 to 37, the cation and anion are SBP and BF4, respectively, with the mass ratio of EiPS and DVL varied from 9:1 to 1:9. In Examples 38 to 42, on the other hand, the mass ratio of EiPS and DVL is fixed to 5:5, with the combination of cation and anion changed from the one used in Examples 29 to 37.

As is evident from the resistance values (mΩ) and evaluations of Examples 29 to 37, the evaluation "Very good for practical use (⊙)" was given when the mass ratio of EiPS and DVL was in a range of 6:4 to 1:9. Although the evaluation was "Slightly good for practical use (Δ)" when the mass ratio of EiPS and DVL was in a range of 9:1 to 7:3, use of these non-aqueous electrolyte solutions in practical applications is amply possible.

Additionally, as is evident from the resistance values (mΩ) and evaluations of Examples 38 to 42, the evaluation "Very good for practical use (⊙)" was given, except for Examples 40 and 41, also when the combination of cation and anion was changed from the one used in Examples 29 to 37. Although the evaluation was "Slightly good for practical use (Δ)" when the combination of cation and anion was TEMA & BF4 or TEMA & PF6, use of these non-aqueous electrolyte solutions in practical applications is amply possible.

[Explanation of Non-aqueous Electrolyte Solutions in Examples 43 to 56 Shown in FIG. 5]

Examples 43 to 56 represent non-aqueous electrolyte solutions whose non-aqueous solvent is a mixed solvent of DMS and GBL. In Examples 43 to 51, the cation and anion are SBP and BF4, respectively, with the mass ratio of DMS and GBL varied from 9:1 to 1:9. In Examples 52 to 56, on the other hand, the mass ratio of DMS and GBL is fixed to 1:9, with the combination of cation and anion changed from the one used in Examples 43 to 51.

As is evident from the resistance values (mΩ) and evaluations of Examples 43 to 51, the evaluation "Good for practical use (◯)" or "Very good for practical use (⊙)" was given when the mass ratio of DMS and GBL was in a range of 2:8 to 1:9. Although the evaluation was "Slightly good for practical use (Δ)" when the mass ratio of DMS and GBL was 3:7, use of this non-aqueous electrolyte solution in practical applications is amply possible.

Additionally, as is evident from the resistance values (mΩ) and evaluations of Examples 52 to 56, the evaluation "Very good for practical use (⊙)" was given also when the combination of cation and anion was changed from the one used in Examples 43 to 51.

It should be noted that, also when the constituent of the non-aqueous solvent was changed from GBL to GVL or DVL, resistance values (mΩ) similar to those in Example 43 to 56 were obtained, along with equivalent evaluations.

[Explanation of Non-Aqueous Electrolyte Solutions in Examples 57 to 70 Shown in FIG. 6]

Examples 57 to 70 represent non-aqueous electrolyte solutions whose non-aqueous solvent is a mixed solvent of EMS and GBL. In Examples 57 to 65, the cation and anion are SBP and BF4, respectively, with the mass ratio of EMS and GBL varied from 9:1 to 1:9. In Examples 66 to 70, on the other hand, the mass ratio of EMS and GBL is fixed to 5:5, with the combination of cation and anion changed from the one used in Examples 57 to 65.

As is evident from the resistance values (mΩ) and evaluations of Examples 57 to 65, the evaluation "Good for practical use (◯)" or "Very good for practical use (⊙)" was given when the mass ratio of EMS and GBL was in a range of 6:4 to 1:9. Although the evaluation was "Slightly good for practical use (Δ)" when the mass ratio of EMS and GBL was in a range of 8:2 to 7:3, use of this non-aqueous electrolyte solution in practical applications is amply possible.

Additionally, as is evident from the resistance values (mΩ) and evaluations of Examples 66 to 70, the evaluation "Very good for practical use (⊙)" was given also when the combination of cation and anion was changed from the one used in Examples 57 to 65.

It should be noted that, also when the constituent of the non-aqueous solvent was changed from GBL to GVL or DVL, resistance values (mΩ) similar to those in Example 57 to 70 were obtained, along with equivalent evaluations.

[Explanation of Non-aqueous Electrolyte Solutions in Examples 71 to 84 Shown in FIG. 7]

Examples 71 to 84 represent non-aqueous electrolyte solutions whose non-aqueous solvent is a mixed solvent of DES and GBL. In Examples 71 to 79, the cation and anion are SBP and BF4, respectively, with the mass ratio of DES and GBL varied from 9:1 to 1:9. In Examples 80 to 84, on the other hand, the mass ratio of DES and GBL is fixed to 1:9, with the combination of cation and anion changed from the one used in Examples 71 to 79.

As is evident from the resistance values (mΩ) and evaluations of Examples 71 to 79, the evaluation "Very good for practical use (⊙)" was given when the mass ratio of DES and GBL was in a range of 2:8 to 1:9. Although the evaluation was "Slightly good for practical use (Δ)" when the mass ratio of DES and GBL was 3:7, use of these non-aqueous electrolyte solutions in practical applications is amply possible.

Additionally, as is evident from the resistance values (mΩ) and evaluations of Examples 80 to 84, the evaluation "Very good for practical use (⊙)" was given also when the combination of cation and anion was changed from the one used in Examples 71 to 79.

It should be noted that, also when the constituent of the non-aqueous solvent was changed from GBL to GVL or DVL, resistance values (mΩ) similar to those in Example 71 to 84 were obtained, along with equivalent evaluations.

[Explanation of Non-Aqueous Electrolyte Solutions in Examples 85 to 98 Shown in FIG. 8]

Examples 85 to 98 represent non-aqueous electrolyte solutions whose non-aqueous solvent is a mixed solvent of MiPS and GBL. In Examples 85 to 93, the cation and anion are SBP and BF4, respectively, with the mass ratio of MiPS and GBL varied from 9:1 to 1:9. In Examples 94 to 98, on the other hand, the mass ratio of MiPS and GBL is fixed to 5:5, with the combination of cation and anion changed from the one used in Examples 85 to 93.

As is evident from the resistance values (mΩ) and evaluations of Examples 85 to 93, the evaluation "Very good for practical use (⊙)" was given when the mass ratio of MiPS and GBL was in a range of 7:3 to 1:9. Although the evaluation was "Slightly good for practical use (Δ)" when the mass ratio of MiPS and GBL was in a range of 9:1 to 8:2, use of these non-aqueous electrolyte solutions in practical applications is amply possible.

Additionally, as is evident from the resistance values (mΩ) and evaluations of Examples 94 to 98, the evaluation "Very good for practical use (⊙)" was given also when the combination of cation and anion was changed from the one used in Examples 85 to 93.

It should be noted that, also when the constituent of the non-aqueous solvent was changed from GBL to GVL or DVL, resistance values (mΩ) similar to those in Example 85 to 98 were obtained, along with equivalent evaluations.

[Explanation of Non-aqueous Electrolyte Solutions in Examples 99 to 112 Shown in FIG. 9]

Examples 99 to 112 represent non-aqueous electrolyte solutions whose non-aqueous solvent is a mixed solvent of EiBS and GBL. In Examples 99 to 107, the cation and anion are SBP and BF4, respectively, with the mass ratio of EiBS and GBL varied from 9:1 to 1:9. In Examples 108 to 112, on the other hand, the mass ratio of EiBS and GBL is fixed to 5:5, with the combination of cation and anion changed from the one used in Examples 99 to 107.

As is evident from the resistance values (mΩ) and evaluations of Examples 99 to 107, the evaluation "Very good for practical use (⊙)" was given when the mass ratio of EiBS and GBL was in a range of 7:3 to 1:9. Although the evaluation was "Slightly good for practical use (Δ)" when the mass ratio of EiBS and GBL was in a range of 9:1 to 8:2, use of these non-aqueous electrolyte solutions in practical applications is amply possible.

Additionally, as is evident from the resistance values (mΩ) and evaluations of Examples 108 to 112, the evaluation "Very good for practical use (⊙)" was given also when the combination of cation and anion was changed from the one used in Examples 99 to 107.

It should be noted that, also when the constituent of the non-aqueous solvent was changed from GBL to GVL or DVL, resistance values (mΩ) similar to those in Example 99 to 102 were obtained, along with equivalent evaluations.

[Explanation of Non-Aqueous Electrolyte Solutions in Examples 113 to 126 Shown in FIG. 10]

Examples 113 to 126 represent non-aqueous electrolyte solutions whose non-aqueous solvent is a mixed solvent of iBiPS and GBL. In Examples 113 to 121, the cation and anion are SBP and BF4, respectively, with the mass ratio of iBiPS and GBL varied from 9:1 to 1:9. In Examples 122 to 126, on the other hand, the mass ratio of iBiPS and GBL is fixed to 5:5, with the combination of cation and anion changed from the one used in Examples 113 to 121.

As is evident from the resistance values (mΩ) and evaluations of Examples 113 to 121, the evaluation "Very good for practical use (⊙)" was given when the mass ratio of iBiPS and GBL was in a range of 7:3 to 1:9. Although the evaluation was "Slightly good for practical use (Δ)" when the mass ratio of iBiPS and GBL was in a range of 9:1 to 8:2, use of these non-aqueous electrolyte solutions in practical applications is amply possible.

Additionally, as is evident from the resistance values (mΩ) and evaluations of Examples 122 to 126, the evaluation "Very good for practical use (⊙)" was given also when the combination of cation and anion was changed from the one used in Examples 113 to 121.

It should be noted that, also when the constituent of the non-aqueous solvent was changed from GBL to GVL or DVL, resistance values (mΩ) similar to those in Example 113 to 126 were obtained, along with equivalent evaluations.

[Explanation of Non-Aqueous Electrolyte Solutions in Examples 127 to 140 Shown in FIG. 11]

Examples 127 to 140 represent non-aqueous electrolyte solutions whose non-aqueous solvent is a mixed solvent of iBsBS and GBL. In Examples 127 to 135, the cation and anion are SBP and BF4, respectively, with the mass ratio of iBsBS and GBL varied from 9:1 to 1:9. In Examples 136 to 140, on the other hand, the mass ratio of iBsBS and GBL is fixed to 5:5, with the combination of cation and anion changed from the one used in Examples 127 to 135.

As is evident from the resistance values (mΩ) and evaluations of Examples 127 to 135, the evaluation "Good for practical use (○)" or "Very good for practical use (⊙)" was given when the mass ratio of iBsBS and GBL was in a range of 7:3 to 1:9. Although the evaluation was "Slightly good for practical use (Δ)" when the mass ratio of iBsBS and GBL was in a range of 9:1 to 8:2, use of this non-aqueous electrolyte solution in practical applications is amply possible.

Additionally, as is evident from the resistance values (mΩ) and evaluations of Examples 136 to 140, the evaluation "Very good for practical use (⊙)" was given also when the combination of cation and anion was changed from the one used in Examples 127 to 135.

It should be noted that, also when the constituent of the non-aqueous solvent was changed from GBL to GVL or DVL, resistance values (mΩ) similar to those in Example 127 to 140 were obtained, along with equivalent evaluations.

[Explanation of Non-Aqueous Electrolyte Solutions in Examples 141 to 154 Shown in FIG. 12]

Examples 141 to 154 represent non-aqueous electrolyte solutions whose non-aqueous solvent is a mixed solvent of BiBS and GBL. In Examples 141 to 149, the cation and anion are SBP and BF4, respectively, with the mass ratio of BiBS and GBL varied from 9:1 to 1:9. In Examples 150 to 154, on the other hand, the mass ratio of BiBS and GBL is fixed to 5:5, with the combination of cation and anion changed from the one used in Examples 141 to 149.

As is evident from the resistance values (mΩ) and evaluations of Examples 141 to 149, the evaluation "Good for practical use (○)" or "Very good for practical use (⊙)" was given when the mass ratio of BiBS and GBL was in a range of 6:4 to 1:9. Although the evaluation was "Slightly good for practical use (Δ)" when the mass ratio of BiBS and GBL was in a range of 9:1 to 7:3, use of this non-aqueous electrolyte solution in practical applications is amply possible.

Additionally, as is evident from the resistance values (mΩ) and evaluations of Examples 150 to 154, the evaluation "Very good for practical use (⊙)" was given, except for Example 152, also when the combination of cation and anion was changed from the one used in Examples 141 to 149. Although the evaluation was "Slightly good for practical use (Δ)" when the combination of cation and anion was TEMA & BF4, use of these non-aqueous electrolyte solutions in practical applications is amply possible.

It should be noted that, also when the constituent of the non-aqueous solvent was changed from GBL to GVL or DVL, resistance values (mΩ) similar to those in Example 141 to 154 were obtained, along with equivalent evaluations.

[Effects Achieved by Non-Aqueous Electrolyte Solutions in Examples 1 to 154]

Of the non-aqueous electrolyte solutions in Examples 1 to 154 explained above, those given the evaluation "Very good for practical use (⊙)," "Good for practical use (○)" or "Slightly good for practical use (Δ)," especially those given the evaluation "Very good for practical use (⊙)" or "Good for practical use (○)," can suppress increase in the resistance value of the electric storage element in a low-temperature environment (−40° C.) and therefore prevent the charge/discharge characteristics of the electric double-layer capacitor itself from dropping significantly even in a low-temperature environment below 0° C. In addition, those given the evaluation "Very good for practical use (⊙)" or "Good for practical use (○)" can decrease the resistance value of the electric storage element in a normal-temperature environment (25° C.) and therefore ensure excellent charge/discharge characteristics of the electric double-layer capacitor itself in a normal-temperature environment.

DESCRIPTION OF THE SYMBOLS

10 - - - Electric double-layer capacitor, 11 - - - Electric storage element, 12a, 12b - - - Collector sheet, 13a, 13b - - - Terminal, 14 - - - Film package

What is claimed is:

1. A non-aqueous electrolyte solution for a double-layer capacitor which is a non-aqueous electrolyte solution constituted by a non-aqueous solvent in which electrolyte salt is dissolved, wherein
the non-aqueous solvent is a mixed solvent of chained sulfone and cyclic lactone compound, wherein a mass ratio of the chained sulfone and the cyclic lactone compound is in a range of 6:4 to 1:9,
the chained sulfone is selected from the group consisting of ethylisopropyl sulfone, ethylmethyl sulfone, isopropylmethyl sulfone, ethylisobutyl sulfone, isobutylisopropyl sulfone, isobutyl sec-butylsulfone, butylisobutyl sulfone, and combinations thereof, and the cyclic lactone compound is selected from the group consisting of γ-butyrolactone, γ-valerolactone, δ-valerolactone, and combinations thereof.

2. A non-aqueous electrolyte solution for the double-layer capacitor according to claim 1, wherein a cation of the electrolyte salt is selected from the group consisting of 5-azoniaspiro[4.4]nonane ion, triethylmethylammonium ion, and a combination thereof.

3. A non-aqueous electrolyte solution for the double-layer capacitor according to claim 1, wherein an anion of the electrolyte salt is selected from the group consisting of tetrafluoroborate ion, hexafluorophosphate ion, bis[(trifluoromethyl)sulfonyl]imide ion, and combinations thereof.

4. A non-aqueous electrolyte solution for the double-layer capacitor according to claim 2, wherein an anion of the electrolyte salt is selected from the group consisting of tetrafluoroborate ion, hexafluorophosphate ion, bis[(trifluoromethyl)sulfonyl]imide ion, and combinations thereof.

5. A non-aqueous electrolyte solution for a double-layer capacitor which is a non-aqueous electrolyte solution constituted by a non-aqueous solvent in which electrolyte salt is dissolved, wherein
the non-aqueous solvent is a mixed solvent of chained sulfone and cyclic lactone compound, wherein a mass ratio of the chained sulfone and the cyclic lactone compound is in a range of 3:7 to 1:9,
the chained sulfone is selected from the group consisting of dimethyl sulfone and diethyl sulfone, and
the cyclic lactone compound is selected from the group consisting of γ-butyrolactone, γ-valerolactone, δ-valerolactone, and combinations thereof.

\* \* \* \* \*